April 11, 1961 R. W. CRUGER 2,979,292
AIRCRAFT ARRESTING HOOK HEAD
Filed Aug. 30, 1956 2 Sheets-Sheet 1

INVENTOR.
ROBERT W. CRUGER
BY
Williams & Tilbury
ATTORNEYS

April 11, 1961 R. W. CRUGER 2,979,292
AIRCRAFT ARRESTING HOOK HEAD
Filed Aug. 30, 1956 2 Sheets-Sheet 2

*INVENTOR.*
ROBERT W. CRUGER
BY Williams & Tilbury
ATTORNEYS

United States Patent Office 2,979,292
Patented Apr. 11, 1961

2,979,292
AIRCRAFT ARRESTING HOOK HEAD

Robert W. Cruger, Philadelphia, Pa., assignor to E. W. Bliss Company, Canton, Ohio, a corporation of Delaware Filed Aug. 30, 1956, Ser. No. 607,029
9 Claims. (Cl. 244—110)

This invention relates to aircraft landing aids, and in particular to arresting devices adapted to rapidly decelerate an aircraft upon landing.

More specifically, this invention relates to improvements in aircraft arresting hooks such as are secured to the underside of an aircraft for engagement with an arresting cable which is adapted to rapidly but smoothly decelerate an aircraft from its landing speed to a condition of rest.

When the hook of an aircraft first makes contact with an arresting cable, the impact between the hook and the cable forms a decided V configuration in the cable. The included angle of this V configuration of the cable is a function of the velocity of the aircraft at the time the cable is engaged and the speed of sound in the cable. The localized stretching of the cable, after impact and before the cable payout system is set into motion places this portion of the cable in tension.

The problem of cable resistance to impact assumes more importance as the landing speeds of aircraft increase. For instance, fighter class propeller-driven aircraft of the type used in World War II could be expected to land on an aircraft carrier at a relative velocity of 35 to 60 knots. With the advent of the heavier jet type fighter plane, weighing 12 to 18 thousand pounds and landing at speeds up to 160 knots, cables must presently withstand much higher impact velocities.

It has been observed that landing hooks presently in use have cable engaging surfaces which are circular in cross-section and of constant radius. It has also been observed that the radius of these cable-engaging hook surfaces make contact with substantially less than one half of the lay length of the cable at first impact. For the purpose of this application, "lay length" is defined to be that linear measure of a wire rope or cable having a plurality of strands helically wound around a core, taken from any reference point on one strand to the next corresponding point on that strand separated helically 360° from the first reference point.

When less than one half lay length of a cable is engaged by an arresting hook, one or more strands of the cable are not directly tensioned by the hook, but rather pick up their share of the load indirectly through bearing or overlapping contact with the initially and directly stressed strands. Otherwise stated, the initially stressed strands are crushed against the non-stressed strands causing severe notching between overlapping wires of adjacent stressed and non-stressed strands which are skew with respect to each other. This combination of compressive and tensile stress in strands results in failure at a much lower value than when loaded in tension only. Should any failure of separate wires take place, further loading of the cable would be uneven with some strands carrying a greater proportion of the load than those strands with severed wires until finally the entire cable fails in tension. Consequently, it follows that if all strands of the cable can be contacted by the hook simultaneously the tendency to notch and crush individual wires of the respective strands is considerably reduced, with the result that the cable can withstand an impact from the arresting hook at far greater velocities.

As aforesaid, the radius of curvature of the cable engaging surface of the hook which will engage that optimum length of the cable, i.e., one half lay length, is a function of both the speed of sound in the cable and the landing speed of the aircraft. This is so since it has been found that the angle of indentation imparted to any particular cable by impact of the landing hook varies nearly as the cube root of the impact velocity. With an aircraft landing at 140 knots, and making engagement with a standard wire rope type cable, the wrap angle of the cable with respect to the hook can be shown to be approximately 18 degrees. "Wrap angle" is defined as being that angle formed between a frontal plane and that portion of the cable which is tangential to the cable engaging surface of the hook. "Cable wrap" is defined as being that linear measure of cable which makes surface contact with the cable engaging surface of the hook, and for a wire rope cable having a lay length of 7 inches, a ½ lay cable wrap on that engaging hook would be 3½ inches.

The impact of the hook on the cable sets up transverse waves, the V configuration of which is the start of the waves, and these waves travel outwardly toward the ends of the cable until resistances are encountered such as cable sheaves, or the like. The waves are then reflected by the sheaves inwardly back toward the hook. The reflections of these transverse waves at the cable sheaves sets up additional stresses in tension in the cable which are additive to the first stress applied to the cable by the impact of the hook.

It has been found that the optimum shape of a cable engaging hook is one which has a cable engaging surface of constant radius which will engage ½ lay length of the cable with the cable engaging surface of the hook being tangential to the legs of the included angle formed in the cable. It is therefore, a principal object of this invention to provide an aircraft arresting hook head which is of an improved shape to reduce undesirable notching, or crushing in the arresting cable.

Other objects of the invention include the provision of an aircraft cable arresting hook having a cable contacting surface adapted to engage at least one half lay length of cable; the provision of a cable contacting surface of a cable engaging hook on an aircraft wherein said surface is of constant radius and is tangential to the included angle in the cable formed by the impact of the hook therewith.

The features of this invention which are believed to be novel are set forth with particularity in the appended claims. The invention itself, however, both as to its organization and use, together with further objects and advantages thereof, may best be understood by reference to the following description taken in connection with the accompanying drawings, in which:

Figure 1:
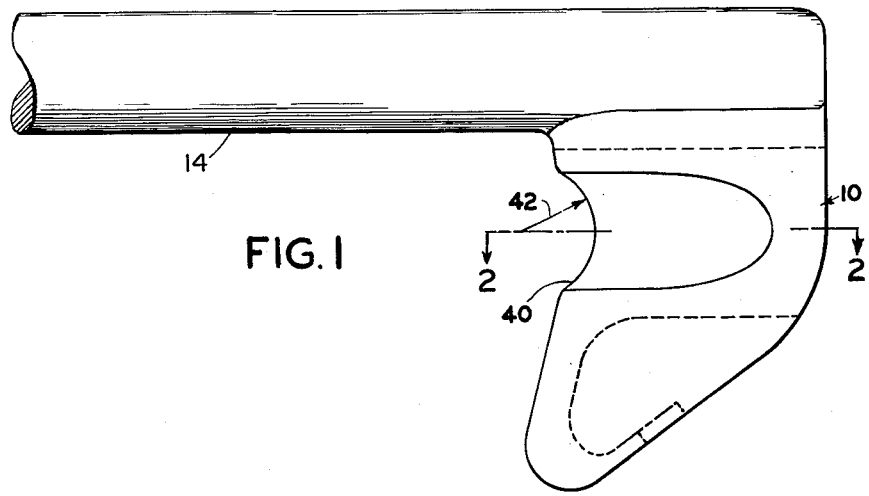
Figure 1 is a side elevational view of a preferred embodiment of the invention.

Reference is now made to the drawings in greater detail. The cable contacting surface 26 (see Figure 2) of the hook 10 comprises an arcuate longitudinal convex groove 12 of constant radius 28, the periphery of which is equal in linear measure to one half lay length of the cable 30 having the correct diameter for which the hook 10 is intended to make engagement. A shaft 14 is secured to hook 10 so as to maintain groove 12 substantially horizontal prior to cable engagement. The surface 26 subtends an arc equal to substantially 18° either side of its centerline to the point of tangency with the cable impact angle for a total span of 36° of arc. The cable engaging arcuate surface 26 is extended on either side by tangential surfaces 32 and 34 of lesser radii 36 and 38 which define the outer limits of the total cable contacting surface. The cable contacting longitudinal convex surface 26 has superposed thereon a transverse concave cable groove 40 of minor radius 42 (see Figure 1) which extends across curved surfaces 32, 26 and 34, and it is this concave groove of minor radius that provides the bearing surface contact with the arresting cable 30. The radius of curvature 42 of this concave groove 40 is such that it will make contact with at least one half of the strands of the cable at any section of the hook. Thus, if the cable is a six strand cable as shown, the concave groove will make contact with three strands, and for an eight strand cable the groove will make contact with four strands, and so forth.

Figure 2:
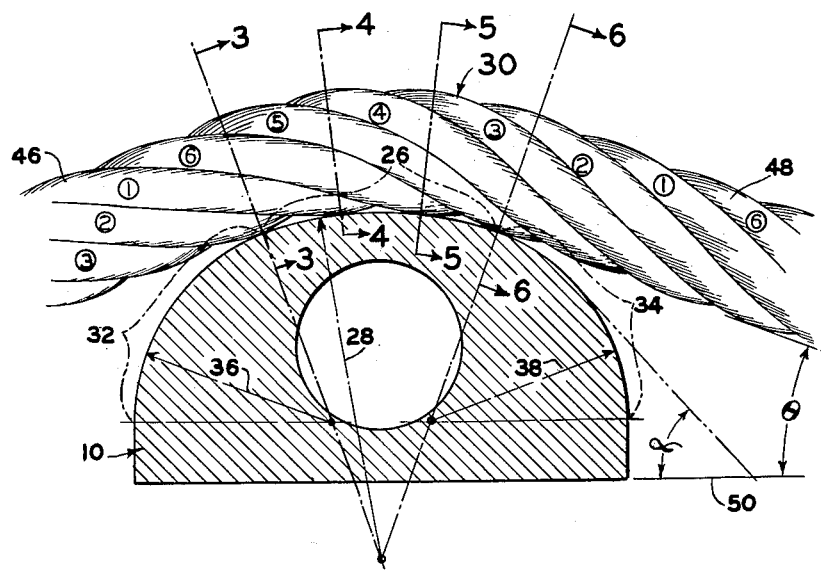
Figure 2 is a sectional view taken on the line 2—2 of Figure 1 showing a horizontal profile of a preferred embodiment of the invention.
Figures 3, 4, 5, 6:
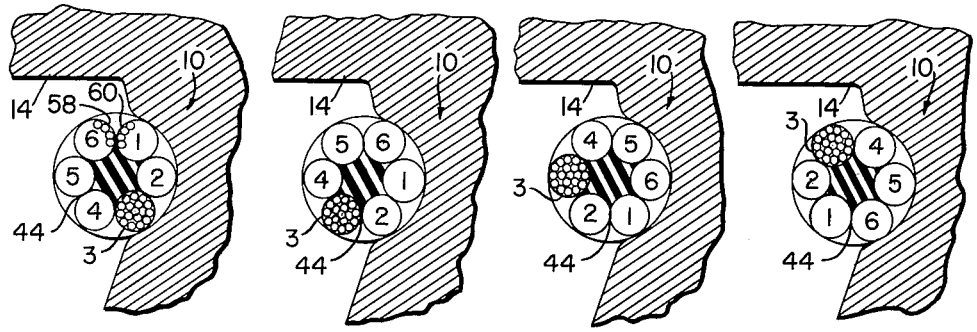
Figure 3 is a fragmentary sectional view taken on the line 3—3 of Figure 2 to show the contact of three of the six cable strands with the cable engaging surface of the hook.
Figure 4 is a fragmentary sectional view taken on the line 4—4 of Figure 2 showing a 60° displacement of the strands with respect to their location as shown in Figure 3.
Figure 5 is a fragmentary sectional view of the arresting cable in contact with the cable engaging hook showing the strands 120° displaced from the strands shown in Figure 3.
Figure 6 is yet another fragmentary sectional view of the cable in contact with the cable engaging surface of the hook to show the strands rotated 180 degrees from the strands as shown in Figure 3.

It will be observed that the six strands of cable 30, numbered 1 through 6 and shown in Figures 3 through 6, are helically wound about a core 44 of the cable so that each strand makes a 360 degree helical turn about the core every lay length of the cable 30. Thus the relative positions of the six strands of cable 30 taken along section line 3—3 of Figure 2 are shown in Figure 3. Figure 4 taken on section line 4—4 of Figure 2 shows the positions of the strands after they have turned helically 60° from their positions shown in Figure 3. Likewise, the cross section of the cable taken along section line 5—5 and shown in Figure 5 shows the strands after 120° of helical turn about the cable core 44, and Figure 6 shows the positions of the strands as seen along section line 6—6 of Figure 2 after 180° of helical turn have been made about the cable core 44. Comparison of the sections of the strands shown in Figure 3 with the sections of the same strands shown in Figure 6, 180° of helical turn removed therefrom, illustrates that the sections of strands in Figure 6 are diametrically opposite from the corresponding sections of strands shown in Figure 3. Thus, every strand has made bearing contact with the cable contacting groove 40 of the hook 10. It will be further observed (see Figure 2) that this one half lay length of cable is engaged by the arcuate surface 26 defined by the radius 28. Furthermore, the portions 46 and 48 of the cable adjacent each side of the one half lay length are tangential to the curved portions 32 and 34 of the hook as defined by radii 36 and 38, and these portions 46 and 48 of the cable 30 form the angle theta with a frontal plane 50 representing the initial position of the cable before impact of the hook 10.

Figure 7:
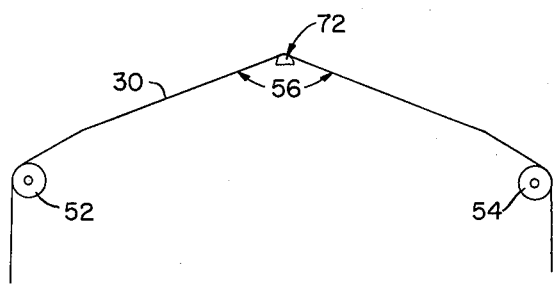
Figure 7 is a schematic diagram of the aircraft arresting cable as it appears immediately after reflection of a transverse wave produced by first impact of the aircraft cable engaging hook.

Figure 7 is a plan view of a cable 30 mounted on a pair of sheaves 52 and 54 immediately after reflection of a transverse wave produced by the first impact of the landing hook 10 whereby a V configuration 56 formed in the cable is a function of the landing speed of the aircraft. For optimum results, as aforesaid the curvature of the contacting surfaces of the hook should engage at least one half lay length of the cable, and be tangential to the legs of the included angle 56 of the cable.

Figure 8:
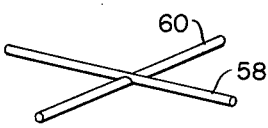
Figure 8 is a perspective view of two overlaying wires of adjacent strands showing how the one wire is notched by pressure against the other wire when the one wire is placed in tension before that of the second wire.

Figure 8 illustrates destructive notching between individual wires, such as wires 58 and 60 of adjacent strands 1 and 6 (see also Figure 3) when one strand is placed in tension by the hook and the adjacent strand is crushed against the stensioned strand. It will be seen that the wire 60 of the tensioned strand notches the wire 58 of strand 6 thereby setting up an area of reduced tensile strength in wire 58 resulting in ultimate failure of the strand and eventually the entire cable.

Generally, for high speed engagements, after the peak tension caused by the reflection of the transverse wave, the cable tension is reduced by motion of the cable payout system as a whole, as well as by other means not the subject of this invention, so that a greater wrap angle of the cable about the hook thereafter can be sustained by the cable without injury thereto. In general, however, the wrap angle at peak tension in the cable for common systems should not exceed that of angle theta shown in Figure 2, although after the tension dissipates, the cable wrap angle can then increase to angle alpha and greater with no harmful effects.

An advantage in reducing the minor radii 36 and 38 of the contacting surface of the hook 10 resides in the reduction of the overall size of the hook both with respect to bulk and to weight. It is recognized that a contact surface of constant radius 28 throughout will theoretically operate as well as the surface defined by radii 36, 28 and 38 respectively of the sook 10 (see Figure 2) but a curvature of constant radius renders a hook of impractical size. For this reason the radii of curvature of the contacting surfaces 32, 26, and 34 have been selected to provide optimum contact with the arresting cable and yet provide a hook of minimum bulk and weight. In effect this produces an elliptically shaped hook head.

The foregoing discussion has been concerned with the relationship between an aircraft arresting hook of optimum configuration for contact with the standard arresting cable. For reasons best known to manufacturers of wire rope and cable, certain standards have been adopted with respect to the manufacture of cable relating to lay length, diameter, and so forth. However, in view of the research undertaken in developing an optimum configuration for the subject aircraft landing hook, standard cable is not ideally suited for aircraft arresting purpose. Although a standard cable can be stretched to some extent, it is not desirable for this cable in general use to stretch beyond certain predefined limits. For the purposes of this invention, however, the more stretch which can be obtained from a cable, the lower will be the impact stress produced in the cable. Accordingly, the shorter the lay length, i.e., the closer and/or the more turns or wraps of strands per foot about the core of the cable, the more the cable will stretch upon impact, and at the same time, as aforesaid, the lower will be the stresses produced on the landing hook and the cable.

Figure 9:
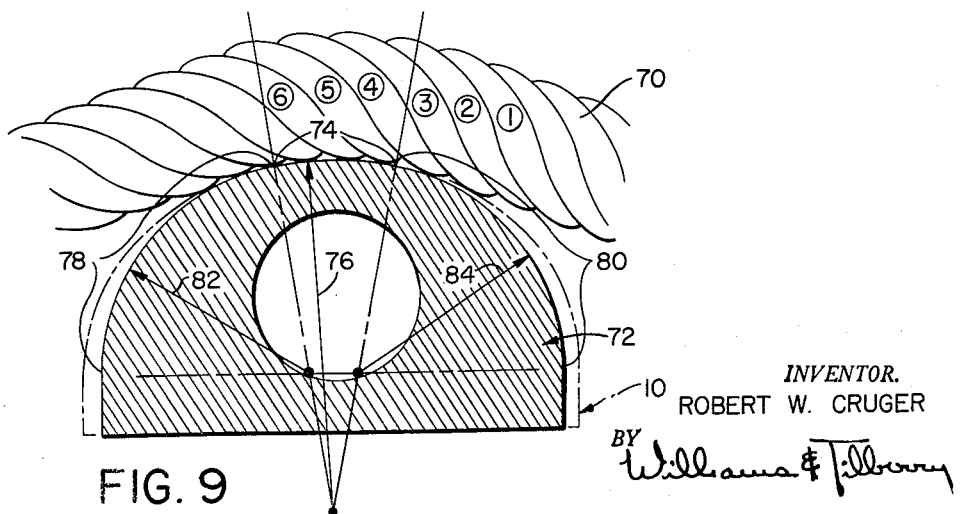
Figure 9 is a sectional view similar to Figure 2 showing a reduction in hook size which may be achieved with specially prepared cable of shorter lay length.

For optimum results, therefore, it is desirable that the landing hook not only have the configuration set forth and described hereinabove, but that the cable have as short a lay length as is mechanically and physically practical consistent with the diameter and physical properties of the individual strands, so that being wound more in the nature of a coil spring the cable will be as flexible under stress as possible. Referring to Figure 9, it will be seen that a cable 70, of the same diameter as cable 30 but with one half the lay length, can be engaged by a hook 72 smaller than hook 10 shown in phantom lines. Otherwise, hook 72 is proportional to hook 10, having a cable engaging surface 74 defined by radius 76, and tangential surfaces 78 and 80 defined by radii 82 and 84 respectively.

In view of the foregoing, it will be seen and understood that by virtue of adapting the surface of contact of the hook to take advantage of the dynamic characteristics of the arresting cable, it is possible to provide an improved arresting hook which will obtain maximum service from the arresting cable as well as contribute to increased safety in the landing operation, and tolerable cable life at higher impact velocities.

While the invention herein shown and described is a typical embodiment, it will be evident that the invention is susceptible to other forms, and that the typical embodiment shown herein is by way of example only and not to be construed in a limiting sense. Other arrangements and modifications will occur to those skilled in the art, and may be resorted to without departing from the scope of the invention.

I claim:

1. In aircraft arresting gear for intercepting an aircraft when making a landing on a runway, including an arresting cable of predetermined diameter and lay length formed of a plurality of helically wound strands and secured transversely of said runway, and a cable engaging hook attachable to an aircraft for engagement with said cable to arrest the forward motion of said aircraft, the improvement in said cable engaging hook comprising: a cable engaging curved surface on said hook of constant radius determined by the predetermined lay length of said cable so as to provide engagement by said hook with one-half lay length of cable wrap at the moment of first impact between said cable and said hook, whereby each cable strand will be simultaneously tensioned by said hook.

2. In aircraft arresting gear for intercepting an aircraft when making a landing on a runway, including an arresting cable of predetermined diameter and lay length formed of a plurality of helically wound strands and secured transversely of said runway, and a cable engaging hook attachable to an aircraft for engagement with said cable to arrest the forward motion of said aircraft, the improvement in said cable engaging hook comprising: a cable engaging curved surface on said hook having major and minor radii of curvature, the curvature of major radius being convex and having a peripheral length equal to one-half of the lay of said cable of predetermined lay length, the curvature of minor radius being concave and having a peripheral length sufficient to make bearing contact at any given point on the cable with one-half of the cable strands; and means to suspend said hook from an aircraft to maintain said major radius of curvature horizontally disposed.

3. In aircraft arresting gear for intercepting an aircraft when making a landing on a runway, including an arresting cable of predetermined diameter and lay length formed of a plurality of helically wound strands and secured transversely of said runway, and a cable engaging hook attachable to an aircraft for engagement with said cable to arrest the forward motion of said aircraft, the improvement in said cable engaging hook comprising: a cable engaging semi-elliptically curved surface on said hook, having a major radius which defines an arc of substantially 36 degrees, and said arc being equal in length to one-half the lay length of said cable of predetermined lay length, said semi-elliptically curved surface having a minor radius of curvature transverse to said major radius and defining a concave surface, and said minor radius being substantially equal to the radius of said cable cross section.

4. In an aircraft arresting gear for intercepting an aircraft when landing, including an arresting cable of predetermined diameter and lay length formed of a plurality of helically wound steel strands and secured transversely of said runway, and a cable engaging hook attachable to an aircraft for engagement with said cable to arrest the forward motion of said aircraft, said cable forming an angular indentation at the locus of engagement of said hook, the improvement in said cable engaging hook comprising: a curved cable engaging surface on said hook having a linear peripheral length equal to one-half of the cable lay length, the radius of curvature of said curved surface defining a curve having extremities tangential to the angular indentation of said cable formed upon impact between said hook and said cable, and said curved surface being of sufficient area to make engagement with all of the strands of said one-half lay length of cable.

5. In an aircraft arresting gear for intercepting an aircraft when landing, including an arresting cable of predetermined diameter and lay length formed of a plurality of helically wound steel strands and secured transversely of said runway, and a cable engaging hook attachable to an aircraft for engagement with said cable to arrest the forward motion of said aircraft, said cable forming an angular indentation at the locus of engagement of said hook, the improvement in said cable engaging hook comprising: a curved cable engaging surface having major and minor radii of curvatures, the curvature of major radius being convex and having a peripheral length equal to one-half of the cable lay length, the curvature of minor radius being concave and transverse to said curvature of major radius and having a peripheral length sufficient to make bearing contact at any cross section of cable with one-half of the cable strands, said curvature of major radius being tangential to the angular indentation of said cable formed upon impact between said hook and said cable.

6. The device set forth in claim 5, including curved surface extensions of minor radius tangential to the opposite extremities of said curved cable engaging surface to produce a smooth continuous elliptical curve adapted to progressively receive additional cable wrap on said hook as the aircraft is decelerated.

7. The device set forth in claim 5, wherein the curvature of major radius is horizontally disposed, and the curvature of minor radius is vertically disposed.

8. In an aircraft arresting gear for intercepting an aircraft when landing, including an arresting cable of predetermined diameter and lay length formed of a plurality of helically wound steel strands and secured transversely of said runway, and a cable engaging hook attachable to an aircraft for engagement with said cable to arrest the forward motion of said aircraft, said cable forming an angular indentation at the locus of engagement of said hook, the improvement in said cable engaging hook comprising: a horizontally disposed semi-elliptically shaped curved surface, the major radius of which defines a curve having a peripheral length equal to one-half cable lay length, said curve being tangential to the angular indentation of said cable formed upon impact between said hook and said cable, and said curve being sufficiently wide in a vertical direction to make engagement with one-half of the strands of said one-half lay length of cable at any given cross section.

9. The device set forth in claim 8, wherein the said curve of major radius defines an arc of substantially 36 degrees.

References Cited in the file of this patent
UNITED STATES PATENTS

| | | |
|---|---|---|
| 1,713,586 | Wright | May 21, 1929 |
| 1,758,744 | Haubert | May 13, 1930 |
| 2,201,904 | Lallier | May 21, 1940 |
| 2,404,381 | Jolly | July 23, 1946 |

FOREIGN PATENTS

| | | |
|---|---|---|
| 138,994 | Sweden | Feb. 3, 1953 |
| 464,060 | Germany | Aug. 9, 1928 |